United States Patent [19]

Sanders

[11] 4,076,089
[45] Feb. 28, 1978

[54] DEVICE FOR LUBRICATING THE SLIDE RAILS ON SNOWMOBILES TRAVELING OVER PACKED SNOW

[76] Inventor: David Leonard Sanders, 1424 18th Ave. NW, New Brighton, Minn. 55112

[21] Appl. No.: 635,989

[22] Filed: Nov. 28, 1975

[51] Int. Cl.² .............................................. B62D 55/24
[52] U.S. Cl. ..................................... 180/5 R; 305/14
[58] Field of Search ...................... 305/14; 180/5 R; 280/604, 605, 28; 188/8

[56] References Cited

U.S. PATENT DOCUMENTS

| 2,506,462 | 5/1950 | Loucks | 188/8 X |
| 2,828,135 | 3/1958 | Koci | 280/605 |
| 2,838,318 | 6/1958 | Marshall | 280/605 |
| 3,897,839 | 8/1975 | Brisebois | 180/5 R |

FOREIGN PATENT DOCUMENTS

| 704,056 | 2/1941 | Germany | 280/604 |

Primary Examiner—Robert B. Reeves
Assistant Examiner—John P. Shannon
Attorney, Agent, or Firm—William L. Huebsch

[57] ABSTRACT

A device for lubricating the slide rails supporting a drive track for a snowmobile moving over packed snow. The device includes a plurality of tines mounted on the snowmobile in front of the slide rails, and having ends positioned to engage, fracture and spray packed snow over which the snowmobile is moving between the track and slide rails to provide lubrication and cooling therebetween.

15 Claims, 6 Drawing Figures

U.S. Patent      Feb. 28, 1978      4,076,089
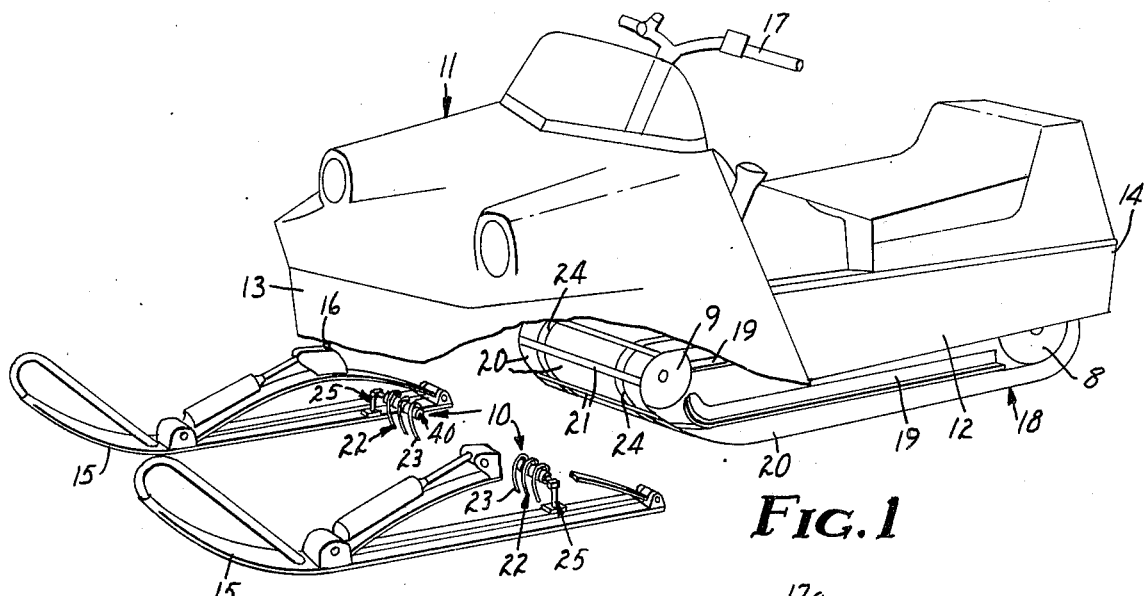
FIG. 1
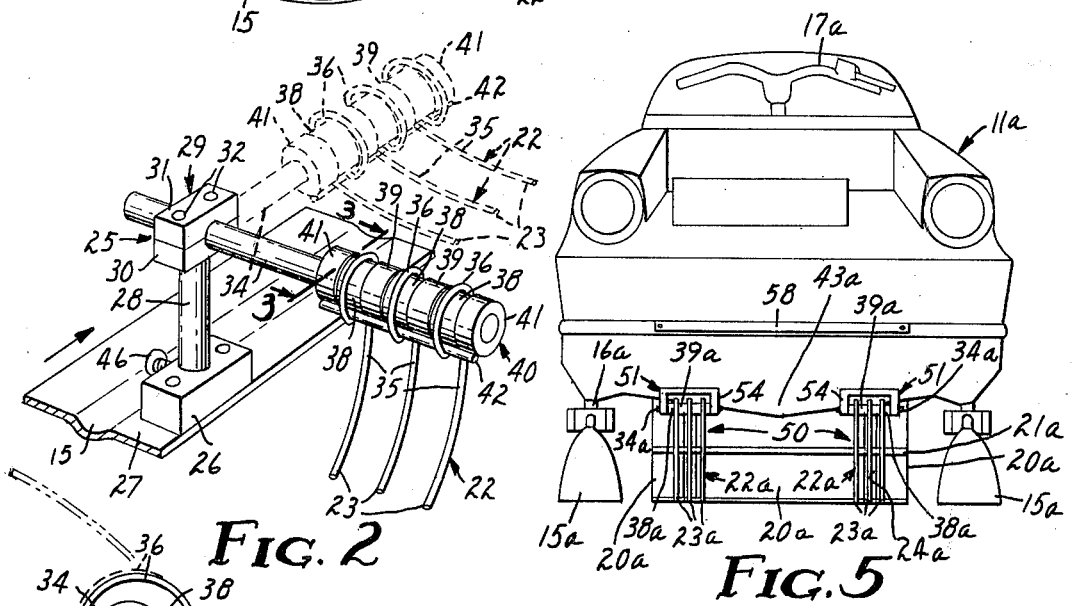
FIG. 2
FIG. 5
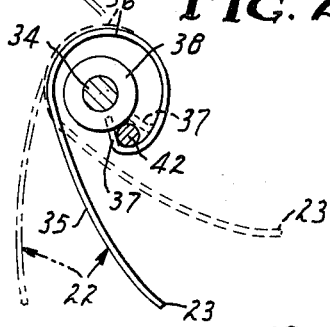
FIG. 3
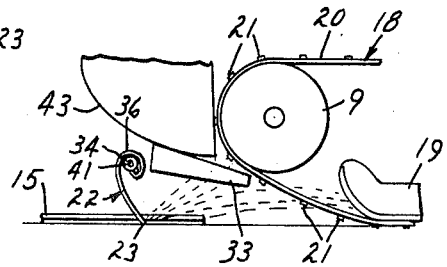
FIG. 4
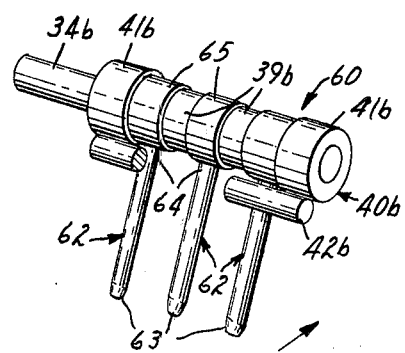
FIG. 6

4,076,089

DEVICE FOR LUBRICATING THE SLIDE RAILS ON SNOWMOBILES TRAVELING OVER PACKED SNOW

BACKGROUND OF THE INVENTION

This invention relates to means for providing adequate lubrication between a drive track and drive track supporting slide rails in a snowmobile.

The use of slide rails in a snowmobile provides firm support for that portion of its endless drive track adjacent the ground. Such slide rail support, however, presents the problem of providing proper lubrication and cooling between the relatively sliding surfaces of the rails and the track, particularly when the snowmobile is being operated over packed snow or ice.

Typically the drive track on such a snowmobile comprises a plurality of endless belt-like portions or belts of similar length having flat outer peripheral surfaces and positioned in side by side spaced relationship, and a plurality of spaced cleat-like portions or cleats transversely crossing the outer peripheries of and joining the belts. The slide rails are supported on the frame of the snowmobile and are positioned against the inner surface of the cleats in the space between two adjacent belts, and along the portion of the drive track on which the snowmobile is supported. When the snowmobile is operated in loose snow, the snow is displaced by the drive track through the openings between the belts and cleats to lubricate and cool the sliding surfaces between the slide rails and the drive track. When the snowmobile is operated for sustained periods over packed snow or ice, however, such lubrication and cooling is not provided. The resulting friction between the slide rails and drive track can cause excessive wearing of the slide rails resulting in their premature replacement, and, in severe cases, can cause the slide rails to fuse to the track which disables the snowmobile.

SUMMARY OF THE INVENTION

The present invention provides a device for providing snow lubrication and cooling of the slide rails of a snowmobile traveling over packed snow or ice to restrict rapid wear of the slide rails or fusing of the slide rails to the drive track.

According to the present invention there is provided a device for use on a snowmobile having a slide rail suspension for the drive track of the type previously described. The device comprises at least one member or tine for each of the slide rails which tine has a terminal end portion adapted to engage packed snow or ice. Also included are means adapted for mounting the tine on the snowmobile with the terminal end portion of the tine forceably engaging packed snow or ice on which the snowmobile is supported and aligned so that, when the snowmobile is moving forward, the terminal end portion of the tine will fracture the packed snow or ice and spray fragments of the snow or ice through the openings between the belts and cleats and between the front end of the slide rail and the drive track to lubricate and cool the relatively sliding surfaces between the slide rails and the drive track.

Preferably the device includes two or more tines for lubricating each slide rail mounted with the end portions of the tines spaced apart to form a converging stream of fractured snow directed into the openings in the drive track which will provide more concentrated and complete lubrication for the slide rail.

Also preferably the tines are of spring steel so that they may flex to accommodate unevenness in the packed snow; and the means for mounting the tines on the snowmobile mounts the tines for pivotal motion about an axis transverse of the snowmobile from the aforementioned position engaged with snow on which the snowmobile is supported at which the tines are maintained against a stop by forward movement of the snowmobile, to disengaged positions out of forceful engagement with snow on which the snowmobile is supported. The tines may be moved to one of their disengaged positions for storage when they are not needed, and are pivoted to one of their disengaged positions by backward motion of the snowmobile so that the tines will not restrict such backward motion.

The means for mounting the tines on the snowmobile may be attached to the frame of the snowmobile or to its skis, the main requirement being that it properly aligns the second ends of tines in front of the slide rails.

In one embodiment of the device adapted for use on a snowmobile with two slide rails, the means for mounting the tines comprises two support assemblies, each of which is adapted to be mounted on the upper surface of a different one of the skis for the snowmobile to support the tines for lubricating and cooling the adjacent slide rail, and each assembly has relatively movable portions affording movement of the tines from their engage position to a storage position over the ski from which they are supported. In another embodiment the means for mounting the tines comprise two support assemblies adapted to be mounted on the bottom pan of a snowmobile, and the tines are pivotable from their engage position to a disengaged storage position lying against the bottom pan of the snowmobile.

BRIEF DESCRIPTION OF THE DRAWING

The invention will be further described with reference to the accompanying drawing wherein like numbers refer to like parts throughout the several views and wherein:

FIG. 1 is a perspective view of a device according to the present invention attached to a snowmobile, parts of which are broken away to show details;

FIG. 2 is an enlarged fragmentary perspective view of one assembly of the device of FIG. 1;

FIG. 3 is a sectional view taken approximately along line 3—3 of FIG. 2;

FIG. 4 is a fragmentary sectional side view of one assembly of the device of FIG. 1 mounted on the snowmobile;

FIG. 5 is a vertical front view of a second embodiment of a device according to the present invention mounted on a snowmobile; and FIG. 6 is a fragmentary perspective view of a third embodiment of the device according to the present invention.

DESCRIPTION OF THE PREFERRED EMBODIMENTS

Referring now to FIG. 1 there is illustrated a first embodiment of a device according to the present invention, generally designated by the numeral 10. The device 10 is shown mounted on a snowmobile 11 of a conventional type comprising a frame 12 having front and rear ends 13 and 14, a pair of parallel skis 15 supporting the front end portion of the frame 12 and pivotal about shafts 16 via a steering handle bar 17 to help direct the snowmobile 11, a drive track 18 supporting the rear end portion of the frame 12 and mounted for movement relative thereto on means comprising idler wheels 8, drive sprockets 9 and a pair of slide rails 19, and means for propelling the drive track 18 including a motor and transmission (not shown).

The drive track 18, best seen in FIGS. 1 and 4, is a conventional structure comprising three endless belt-like portions or belts 20 having flat outer peripheral surfaces and positioned in side by side spaced relationship by a plurality of spaced cleat-like portions or cleats 21 fixedly attached thereto (i.e. the belts 20 and cleats 21 may be attached as by rivets or may be integrally molded), which cleats 21 transversely cross the outer peripheries of the belts 20 and define opening 24 therebetween. Each slide rail 19 slidably engages and is supported by the inner surfaces of the cleats 21 along that portion of the drive track 18 disposed against the snow in the spacing between two of the adjacent belts 20.

The device 10 comprises a plurality of elongate tines 22 of spring steel each having a terminal end portion 23 adapted to engage packed snow on which the snowmobile 11 is supported; and means adapted for mounting the tines 22 on the snowmobile 11 with the terminal end portions 23 of the tines 22 forceably pressed against the packed snow on which the snowmobile 11 is supported and aligned so that, when the snowmobile 11 is moving generally straight forward, the terminal end portions 23 will fracture the packed snow and spray fragments of the snow through the openings 24 between the front end of each slide rail 19 and the drive track 18. Such fragments of snow lubricate and cool the relatively sliding surfaces therebetween as the slide rails 19 slide over the portion of the drive track 18 supporting the snowmobile 11 on the snow.

As illustrated in FIG. 4, the deive 10 may also include a pair of snow directing troughs 33 attached to (or which could be formed in) a bottom pan 43 of the snowmobile 11. Each trough 33 faces and extends between some of the tines 22 and the aligned openings 24. A wide end of the trough 43 is positioned adjacent the tines 22 and the trough 33 converges toward the openings 24 so that the trough 33 will help direct snow fractured by the tines 22 through the opening 24 and between the adjacent drive track 18 and slide rail 19.

As is best seen in FIGS. 1 and 2, the means adapted for mounting the tines 22 on the snowmobile 11 comprises two support assemblies 25, each of which assemblies 25 includes a rectangular block 26 which is bolted to the upper surface of an inner flange 27 on one of the skis 15 for the snowmobile 11. The block 26 of each assembly 25 supports a vertical portion or first shaft 28 projecting normally upward from the upper surface of the ski 15. At the end of the first shaft 28 opposite the block 26 is a clamp assembly 29 comprising a base 30 fixed to the end of the first shaft 28 opposite the block 26 and a cap 31 attached to the base 30 by a pair of bolts 32 about a horizontal portion or second shaft 34 extending normal to the first shaft 28 and transverse of the snowmobile 11 on which second shaft 34 the tines 22 are supported. The bolts 32 can be loosened to afford adjustment of the position of the terminal end portions 23 of the tines 22 transversely of the drive track 18 via sliding the second shaft 34 axially within the clamp assembly 29 to insure proper alignment of the tines 22 with the slide rails 19.

The support assemblies 25 for mounting the tines 22 include relatively movable portions which afford moving the tines 22 between their engage position with their terminal end portions 23 in engagement with packed snow on which the snowmobile 11 is supported, and various disengaged positions (see dotted outline in FIG. 3) at which each tine 22 is out of forceful engagement with the surface on which the snowmobile 11 is supported and to a storage position at which the tines 22 will be retained in one of their disengaged positions.

As is best seen in FIGS. 2 and 3 each tine 22 includes a generally straight portion 35 on which its terminal end portion 23 is defined, an arched portion 36 opposite its terminal end portion 23 which is arched through almost 360°, and a second end portion 37 extending radially inwardly of the arched portion 35. The second end portion 37 is radially fixed in a ring 38 rotatably supported on the second shaft 34. Two hollow cylindrical spacers 39 are positioned between the rings 38 to space the tines 22 apart. The rings 38 and spacers 39 are positioned axially on the second shaft 34 by a tine stop bracket 40 comprising two end ring portions 41 having axially aligned central openings through which the second shaft 34 extends with the rings 38 and spacers 39 therebetween, and a bar-like portion 42 fixed to and extending between the peripheries of the end ring portions 41 with the bar-like portion 42 spaced from the peripheries of the rings 38 to afford rotation thereof. The end ring portions 41 are fixed to the second shaft 34 with the bar-like portion 42 in a position so that each tine 22 and rings 38 assembly can be freely rotated between its engage positions (shown in solid in FIG. 3) and disengaged positions (such as the positions shown in dotted outline in FIG. 3) which rotation facilitates backing up the snowmobile without excessive digging of the terminal end portions 23 of the tines into the surface on which the snowmobile 11 is supported, and storing the tines 22 when not in use. At the engage position of each tine 22 is generally straight portion 35 is inclined with its terminal end portion 23 directed generally away from the front end 13 of the snowmobile 11, and a side surface of its terminal end portion 23 adjacent the front end 13 of the snowmobile 11 is biased against packed snow beneath the snowmobile 11 by engagement of an opposite side surface of the tine 22 along its second end portion 37 with the bar-like portion 42 of the tine stop bracket 40 and deflection of the tine 22 between the bar-like portion 42 and the snow.

While the tines 22 of the device 10 could be stored by providing means for maintaining the tine 22 and ring 38 assemblies in one of their disengage positions with the second shafts 34 aligned transverse of the snowmobile 11, preferably the support means additionally affords movement of the second shafts 34 (after the ring 38 and tine 22 assemblies supported thereon are rotated to their disengaged position most distant from their engage position with their second end portions 37 contacting the bar-like portion 42 on its side opposite that contacted when the tine 22 is in its engage position) to a position over the ski 15 on which each is mounted to provide the storage position for the tines 22. This storage position insures that the support assembly 25 will not plow deep snow beneath the snowmobile 11 in which the device 10 is not needed.

As is best seen in FIG. 2 the first shaft 28 is fixed against rotational and axial movement in the block 26 by releasable means such as a spring loaded pin 46 mounted in the block 26 and normally engaged with a socket in the second shaft 28 (which could also be a thumb screw threaded in the block 26 and engaged with a socket or a flatted position on the first shaft 38). By releasing the pin 43 (or loosening the thumb screw) the first shaft 28 can be rotated about its axis from its first position illustrated in solid outline in FIG. 2, to a second position illustrated in dotted outline in FIG. 2 with the second shaft 34 extending longitudinally of the ski 15.

FIG. 5 illustrates an alternate embodiment of a device according to the present invention generally designated by the numeral 50 in which portions similar to portions of the device 10 are similarly numbered except for the addition of the suffix "a."

Like the device 10, the device 50 comprises two support assemblies 51 which provide means for supporting a plurality of tines 22a on a snowmobile 11a with terminal end portions 23a of the tines 22a forceably pressed against packed snow on which the snowmobile 11a is supported. Each tine 22a has a second end portion fixed to a ring 38a rotatably supported on a second shaft 34a of one of the assemblies 51. The rings 38a are spaced by spacers 39a and axially retained by a tine stop bracket including a bar-like portion like the time stop bracket 40 which limits pivotal movement between engaged and disengaged positions corresponding to those positions for the tines 22 of the device 10. Unlike the assemblies 25, however, the second shaft 34a for each support assembly 51 is supported on the bottom pan 43a of the snowmobile 11a between its skis 15a by a generally U-shaped bracket 54 fixed to the ends of its second shaft 34a and to the pan 43a.

In the device 50 the tines 22a may be stored in one of their disengaged positions with the tines 22a lying along the outer surface of the bottom pan 43a, which position may be maintained by means such as a strap 58 attached at its ends to the snowmobile 11a. The strap 58 may be inflexible and releasably attached to the bottom pan 53 as by snap fasteners, or may be elastic to afford stretching it around the ends of tines 22a laying against the bottom pan 43a.

FIG. 6 illustrates an alternate embodiment of a device according to the present invention, generally designated by the numeral 60 in which device 60 portions similar to portions of the device 10 are similarly numbered except for the addition of the suffix "b," and for which only one support assembly 61 of two assemblies is illustrated.

The device 60 includes means for supporting a plurality of tines 62 on a snowmobile with their terminal end portions 63 forceably pressed against packed snow on which the snowmobile is supported. These means may include support assemblies adapted for mounting on the skis or on the bottom pan of a snowmobile in the manner of the support assemblies for the devices 10 or 50 (that portion of the device 60 not being shown), and includes a second shaft 34b. Also included are spacers 39b and a tine stop bracket 40b similar to those of the devices 10 and 50. Unlike the devices 10 and 50, however, the tines 62 of the devices 60 are straight and essentially rigid with tapered terminal end portions 63 adapted to engage packed snow. A second end portion 64 of each tine 62 is radially fixed to a ring 65 rotatably mounted on the second shaft 34b for rotation between engage and disengage positions against a bar-like portion 42b of the stop bracket 40b, which positions correspond to those positions for the tines of the devices 10 and 50.

I claim:

1. A device adapted for use on a snowmobile including a frame with front and rear ends, a drive track comprising a plurality of endless belts of similar length having flat outer peripheral surfaces and positioned in side by side spaced relationship, a plurality of spaced cleats transversely crossing the outer peripheries of and joining said belts, and means mounting said track for movement relative to said frame comprising a plurality of parallel slide rails each being a longitudinal bar mounted on said frame, having front and rear ends respectively adjacent the front and rear ends of the frame, and slidably engaging and being supported by the inner surfaces of the cleats along the portion of said track disposed to support the snowmobile in the spacing between two of said adjacent belts, wherein said device comprises for each of said slide rails at least one steel tine having a spring temper and a terminal end portion adapted to engage packed snow, and means for mounting the tine on a said snowmobile to deflect said tine between said terminal end portion and said means for mounting with said terminal end portion of the tine forceably engaging packed snow on which the snowmobile is supported and aligned between the front end of said frame and the slide rail of the snowmobile so that when the snowmobile is moving forward the terminal end portion of said tine will fracture the packed snow and spray fragments of the packed snow through the openings between the belts and cleats of the drive track of the snowmobile and between the slide rail and drive track of the snowmobile adjacent the front end of the slide rail to provide lubrication and cooling therebetween.

2. A device according to claim 1, further comprising a plurality of said tines for each of the slide rails of a said snowmobile, said tines having terminal end portions adapted to be spaced and positioned by said means for mounting the tines to direct a converging spray of packed snow fragments into the openings in the drive track adjacent the front end of the slide rail.

3. A device according to claim 1, wherein said means for mounting the tine comprises relatively movable portions affording movement of said tine from said position with said terminal end portion of the tine positioned to forceably engage packed snow, and disengaged positions with the terminal end portion of said tine out of forceful engagement with a surface on which the snowmobile is supported, and said device includes means for retaining said tine in one of said disengaged positions.

4. A device according to claim 1, wherein said means for mounting said tine comprises a support assembly including a horizontal portion and adapted to be fixed to a said snowmobile in a position with said horizontal portion projecting generally horizontally transverse of said snowmobile, a collar fixed to an end of the tine opposite said terminal end portion rotatably mounted about said horizontal portion of said support assembly, and a stop bracket fixed to said horizontal portion of said support assembly and engaging one side surface of said tine to position the terminal end portion of said tine in engagement with packed snow on which the snowmobile is supported and prevent rotation of said collar and pivotal motion of said time to move the terminal end portion of said tine out of engagement with the packed snow in response to forces applied to the terminal end portion of said tine when the snowmobile moves in a forward direction, while affording pivotal motion of said tine to move said tine out of forceful engagement with the surface on which the snowmobile is supported upon forces applied to the terminal end portion of the tine in a direction toward the front of the snowmobile, as when the snowmobile is moved in a backward direction.

5. A device according to claim 4, wherein said device is adapted to be mounted on a bottom pan of a said snowmobile, said tine is pivotable to a disengaged storage position lying against the bottom pan of the snowmobile, and said device includes means for retaining said tine in said disengaged storage position.

6. A device according to claim 4 adapted for use on a said snowmobile having spaced parallel skis supporting the front end of the frame, wherein said support assembly further includes a base adapted for attachment to the surface of one of the skis opposite and generally parallel to the snow on which the snowmobile is supported, and a vertical portion fixed to said base and projecting normally away from said ski surface in a direction opposite the snow to which said horizontal portion is fixed, said vertical portion being rotatably mounted in said base to afford movement of said support assembly from said position at which said horizontal portion is transverse of the snowmobile and said tine and collar may be pivoted to said position with said terminal end portion of the tine positioned to forceably engage packed snow on which the snowmobile is supported, and, after said tine and collar are rotated out of forceful engagement with the surface on which the ski is supported, to a storage position at which said horizontal portion of said support assembly is generally in longitudinal alignment with the ski of the snowmobile; and means for releasably retaining said support assembly in either of said positions.

7. A device adapted for use on a snowmobile including a frame with front and rear ends, a drive track comprising a plurality of endless belts of similar length having flat outer peripheral surfaces and positioned in side by side spaced relationship, a plurality of spaced cleats transversely crossing the outer peripheries of and joining said belts, and means mounting said track for movement relative to said frame comprising a plurality of parallel slide rails each being a longitudinal bar mounted on said frame, having front and rear ends respectively adjacent the front and rear ends of the frame, and slidably engaging and being supported by the inner surfaces of the cleats along the portion of said track disposed to support the snowmobile in the spacing between two of said adjacent belts, wherein said device comprises for each of said slide rails a plurality of tines having a terminal end portion adapted to engage packed snow, and means for mounting the tines on a said snowmobile with said terminal end portions of the tines spaced and positioned to forceably engage packed snow on which snowmobile is supported and aligned between the front end of said frame and the slide rail of the snowmobile so that when the snowmobile is moving forward the terminal end portions of said tines will fracture the packed snow and direct a converging spray of fragments of the packed snow through the openings between the belts and cleats of the drive track of the snowmobile and between the slide rail and drive track of the snowmobile adjacent the front end of the slide rail to provide lubrication and cooling therebetween.

8. A device according to claim 7, wherein said means for mounting said tines comprises two support assemblies each including a horizontal portion and adapted to be fixed to a said snowmobile in a position with said portion projecting generally horizontally transverse of said snowmobile, a collar fixed to an end of the tine opposite said terminal end portion rotatably mounted about said horizontal portion of said support assembly, and a stop bracket fixed to said horizontal portion of said support assembly and engaging one side surface of said tines to position the terminal end portions of said tines in engagement with packed snow on which the snowmobile is supported and prevent rotation of said collar and pivotal motion of said tines to move the terminal end portions of said tines out of engagement with the packed snow in response to forces applied to the terminal end portions of said tines when the snowmobile moves in a forward direction, while affording pivotal motion of said tines to move said tines out of forceful engagement with the surface on which the snowmobile is supported upon forces applied to the terminal end portions of the tines in a direction toward the front of the snowmobile, as when the snowmobile is moved in a backward direction.

9. A device according to claim 8, wherein said device is adapted to be mounted on a bottom pan of a said snowmobile, said tines are pivotable to a disengaged storage position lying against the bottom pan of the snowmobile, and said device includes means for retaining said tines in said disengaged storage position.

10. A device according to claim 8 adapted for use on a said snowmobile having spaced parallel skis supporting the front end of the frame, wherein said support assemblies each further include a base adapted for attachment to a different one of the skis on its surface opposite and generally parallel to the snow on which the snowmobile is supported, and a vertical portion fixed to said base and projecting normally away from said ski surface in a direction opposite the snow to which said horizontal portion is fixed, said vertical portion being rotatably mounted in said base to afford movement of said support assembly from said position at which said horizontal portion is transverse of the snowmobile and said tines and collars may be pivoted to said position with said terminal end portions of the tines positioned to forceably engage packed snow on which the snowmobile is supported, and, after said tines and collars are rotated out of forceful engagement with the surface on which the ski is supported, to a storage position at which said horizontal portion of said support assembly is generally in longitudinal alignment with the ski of the snowmobile on which it is mounted; and means for releasably retaining said support assemblies in either of said positions.

11. A method for lubricating the slide rails on a snowmobile traveling forward over packed snow wherein the snowmobile is of the type having a drive track comprising a plurality of endless belts of similar length having flat outer peripheral surfaces and positioned in side by side spaced relationship, a plurality of spaced cleats transversely crossing the outer peripheries of and joining said belts, and means mounting said track for movement relative to said frame comprising a plurality of parallel slide rails, each slide rail being a longitudinal bar having front and rear ends and slidably engaging and being supported by the inner surfaces of cleats along said track in the spacing between two of said adjacent belts, wherein the method comprises:

providing a plurality of stiff tines having terminal end portions adapted to engage packed snow; and supporting said tines from said snowmobile with the terminal end portions of the tines forceably engaging packed snow on which the snowmobile is supported and aligned between the front end of the frame and the front end of the slide rails so that the end portions of the tines will engage, fracture and spray up fragments of the packed snow and the snow fragments will be directed through spaces between the belts and the cleats and between the slide rail and drive track adjacent the front end of the slide rail to provide lubrication and cooling therebetween.

12. In a snowmobile including a frame with front and rear ends, a drive track comprising a plurality of endless belts of similar length having flat outer peripheral surfaces and positioned in side by side spaced relationship, a plurality of spaced cleats transversely crossing the outer peripheries of and joining said belts, and means mounting said track for movement relative to said frame comprising a plurality of parallel slide rails each being a longitudinal bar mounted on said frame, having front and rear ends respectively adjacent the front and rear ends of the frame, and slidably engaging and being supported by the inner surfaces of the cleats along the portion of said track disposed to support the snowmobile in the spacing between two of said adjacent belts, the improvement wherein said snowmobile comprises for each of said slide rails at least one tine having a terminal end portion adapted to engage packed snow, and means mounting the tine with said terminal end portion of the tine forceably engaging packed snow on which the snowmobile is supported and aligned between the front end of said frame and the front end of the slide rail so that when the snowmobile is moving forward the terminal end portion of said tine will fracture the packed snow and spray fragments of the packed snow through the openings between the belts and cleats of the drive track of the snowmobile and between the slide rail and drive track of the snowmobile adjacent the front end of the slide rail to provide lubrication and cooling therebetween.

13. A snowmobile according to claim 12 wherein said tine is of steel having a spring temper, and said means for mounting the tine deflects said tine between said terminal end portion and said means for mounting to forceably engage said terminal end portion with packed snow on which the snowmobile is supported.

14. A snowmobile according to claim 12 further comprising a plurality of said tines for each of the slide rails, said tines having terminal end portions adapted to be spaced and positioned by said means for mounting the tines to direct a converging spray of packed snow fragments into the openings in the drive track adjacent the front end of the slide rail.

15. A snowmobile according to claim 12 wherein said means for mounting the tine comprises relatively movable portions affording movement of said tine from said position with said terminal end portion of the tine positioned to forceably engage packed snow, and disengaged positions with the terminal end portion of said tine out of forceful engagement with a surface on which the snowmobile is supported, and said device includes means for retaining said tine in one of said disengaged positions.

* * * * *